Figure 1:
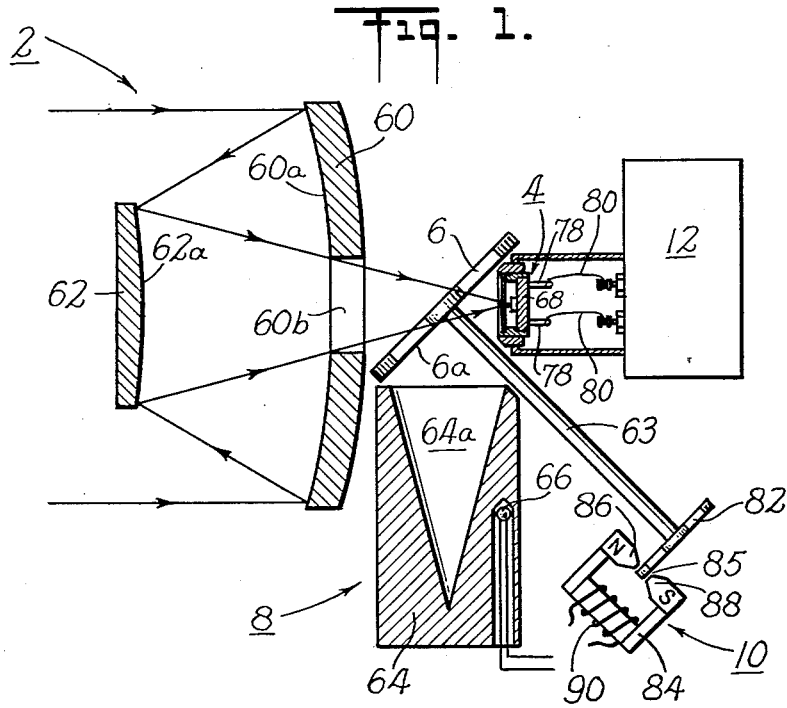

Dec. 13, 1960 R. W. ASTHEIMER 2,963,910
ELECTRICAL SIGNAL OFFSETTING APPARATUS
Filed Aug. 15, 1955 2 Sheets-Sheet 1

INVENTOR
*Robert W. Astheimer*
BY
*John C. Blair*
ATTORNEY

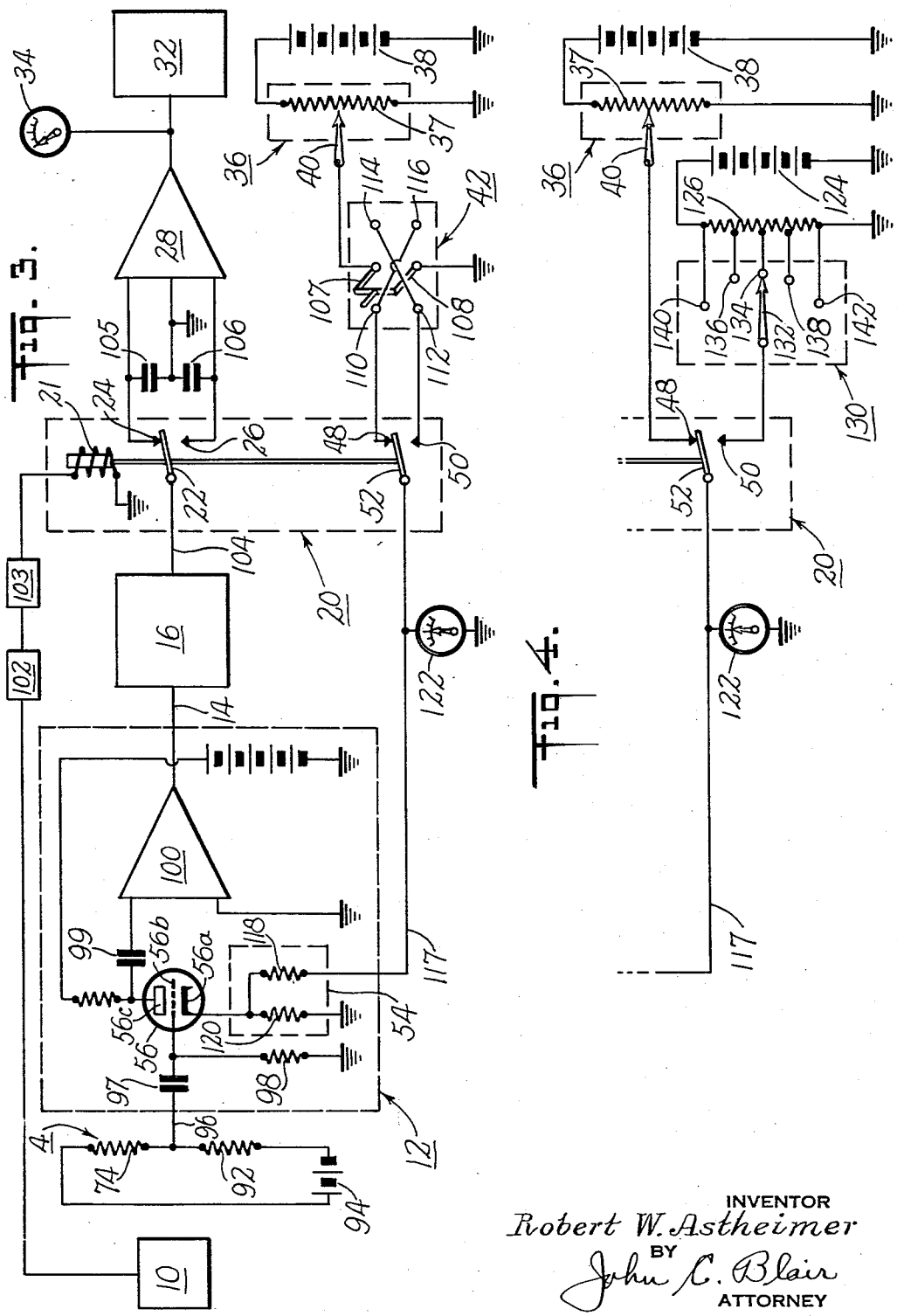

United States Patent Office 2,963,910
Patented Dec. 13, 1960

2,963,910

ELECTRICAL SIGNAL OFFSETTING APPARATUS

Robert W. Astheimer, Springdale, Conn., assignor to Barnes Engineering Company, Stamford, Conn., a corporation of Delaware Filed Aug. 15, 1955, Ser. No. 528,507

7 Claims. (Cl. 73—355)

This invention relates to apparatus for offsetting or reducing in size electrical signals which are to be recorded. More specifically, it deals with offsetting apparatus for use in radiometers or other apparatus where the alternating signal to be recorded may be variable in frequency and phase.

Radiometers are devices for measuring infra-red radiation by optical means and are useful for measuring temperatures where inaccessability prevents direct measurement. For example, they may be used to measure temperatures in areas of high radioactivity, in the interior of furnaces, or temperature changes in overhead pipes and conduits. They can also measure the temperatures of corrosive liquids by emitted radiation. To accomplish such measurement, infra-red radiation from the source of unknown temperature is usually focused by a reflective optical system on a thermally sensitive resistor device called a "thermistor bolometer." Any change in incident radiation causes a change in temperature of the thermistor bolometer, and a corresponding change in its resistance. The thermistor bolometer is electrically biased from a source of direct voltage and the change in resistance causes a change in current flowing through the bolometer. To avoid the use of direct current amplifiers, the incoming radiation is chopped i.e. periodically interrupted by a spoked rotating disc or the like. Thus the generated signal is a varying direct voltage which may be amplified by conventional alternating current amplifiers. After amplification and synchronous rectification the signal is usually displayed on a direct writing recorder, a device having a pen or stylus whose deflection is proportional to the applied voltage which writes on a moving paper chart.

To provide a comparison standard for measuring the incoming signal, and to provide a partial offset, a source of infra-red energy of known temperature is usually included in conventional radiometers. Infra-red radiation from this source is allowed to fall on the thermistor bolometer alternately with the chopped radiation from the source of unknown temperature. Thus the signal developed by the thermistor bolometer is a varying direct voltage whose amplitude is proportional to the difference between the temperature of the unknown and the known source, hereinafter called the "reference" source.

The measuring of radiation by this technique, i.e. periodically allowing radiation from the unknown source and from the reference source to fall on the radiometer to develop an alternating difference signal and then amplifying this signal, has significant advantages over the direct current method. In this latter method radiation from the source whose temperature is to be measured is allowed to fall on the radiometer and the output voltage is measured. Radiation from the reference source is then allowed to fall on the radiometer to supply a calibration. The measured temperature can then be calculated from the measured voltage. However, using this technique, the radiometer is measuring the absolute value of the temperature of the unknown source, which at room temperature would be about 300° K. Amplifier drifts, drifts in the measuring element caused by changes in ambient temperatures and other variations may result in uncertainties in the output of a small percentage. The effect of ambient temperature changes is very marked since measured temperature is proportional to the square of resistance and the fourth power of radiation. Thus, a 2 unit uncertainty in the temperature of the measuring element would correspond to a 16 unit uncertainty in the radiation falling thereon. A 1% uncertainty in a measurement of 300° K. would be 3°. This may be larger than the temperature variation that it is desired to measure in the unknown source. Accordingly, this "direct-current method" is not useful when small variations in temperature are to be measured with a radiometer.

In the "alternating current" method described herein, the measuring element is measuring only a difference in temperature which may be made quite small. For example, if the difference between the reference and unknown sources is about 25°, a 1% uncertainty in the measuring element would be only 0.25°; such as an uncertainty would permit accurate measurement of temperature variations of the order of 3°.

When the temperature of the reference source is very close to the average temperature of the unknown source, a maximum offset is obtained, and the resulting signal may be displayed using a very sensitive recorder scale to make variations in temperature of the unknown source readily apparent. Since it is usually temperature variation, as opposed to absolute temperature that is sought in the measurement, it is desirable to keep the reference source as close to the average temperature of the unknown source as possible. This can be accomplished in some cases by allowing the reference source to follow the ambient temperature and accurately measuring its temperature each time a measurement is made. However, if the ambient at the radiometer is different from the average temperature of the unknown source, a large average signal will be developed by the thermistor, and small variations in its amplitude will not be readily seen.

To obviate measuring the temperature of the reference source each time a reading is made, its temperature can be fixed by heating the source with a thermostatically controlled electric heater. However, for effective control, the known temperature must be set above the highest ambient to be expected. Thus in radiometer units using a reference source of controlled temperature there is always a difference between the average temperature of the unknown source and the known source; this may be quite large and small variations in the incoming signal again may not be large enough to be seen on the recorder. This situation makes additional offsetting means dsirable by which the thermistor bolometer generated signals are offset electronically before recording. If such additional offsetting means are used, the recorder sensitivity may be set so that small amplitude variations in the incident signal are readily apparent.

Apparatus for offsetting alternating signals of known frequency and phase, or direct signals has been used for some time. To offset a direct voltage signal, one adds to the signal a direct voltage of known magnitude and opposite polarity. Similarly an alternating signal may be offset by adding to the signal another voltage of known amplitude of the same frequency but of opposite phase. However, the alternating signal developed by the thermistor bolometer of a radiometer whose frequency and phase are determined by the speed of rotation and position of the chopping device cannot be offset with a second alternating voltage since the frequency and phase of this signal has no common reference with any other voltage. To generate an offsetting signal for the signal developed by the thermistor bolometer I utilize an electrically operated high speed switch, called a "synchronous contactor," which is also used to convert the alternating signal voltage to a direct voltage for recording. The synchronous contactor is operated by a pulse train developed by a pulse generator driven from the same shaft as the chopper, and is therefore in synchronous frequency and phase with the signal. By using a set of contacts on this high speed switch an alternating voltage is developed from a direct voltage source which is either in phase, or 180° out of phase, with the signal voltage, and this alternating voltage is added to or subtracted from the voltage developed by the thermistor bolometer to offset it for recording. Because it is desirable to offset the signal before amplification to minimize the dynamic range requirements of the amplifiers, such offsetting takes place before or at the input to the amplification system.

Accordingly it is an object of this invention to provide means for accurately recording small variations in large signals of nonstandard frequency and phase. Another object is to provide in apparatus of the above character a calibrated voltage in proper phase and frequency to offset a nonstandard frequency signal. Another object is to provide apparatus of the above character for use in radiometers to record small temperature variations in a radiation source with maximum sensitivity. Still another object is to provide in apparatus of this type a reversible offset voltage for use in offsetting input voltages of either phase. A still further object is to provide calibrating apparatus for the output recorder of a radiometer in connection with apparatus of the character described. Other objects of the invention will in part be obvious and will in part appear hereinafter.

The invention accordingly comprises the features of construction, combinations of elements, and arrangements of parts, which will be exemplified in the constructions hereinafter set forth and the scope of the invention will be indicated in the claims.

Figure 2:
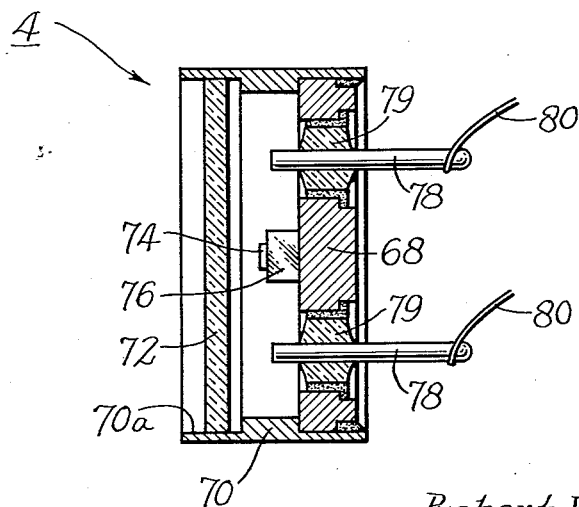

For a fuller understanding of the nature and objects of the invention, reference should be had to the following detailed description taken in connection with the accompanying drawings in which:

Figure 1 is a diagrammatic representation of a typical radiometer optical system with pulse generating equipment such as may be used with my invention, Figure 2 is an enlarged section of a portion of Figure 1 showing the construction of the thermistor bolometer unit, Figure 3 is a circuit diagram partially in block and partially in schematic form, showing one embodiment of my invention, and Figure 4 is a schematic diagram representing another aspect of such circuit and hence comprising another embodiment of my invention.

In general, as shown in Figure 1, incoming infra-red radiation striking the optical system generally indicated at 2 is reflected to the thermistor bolometer generally indicated at 4, when not interrupted by the rotating chopping disc 6. Surface 6a of chopping disc 6 is silvered to act as a mirror and when radiation from the unknown source is interrupted by the chopping disc, radiation from a reference or known source generally indicated at 8 is reflected from surface 6a to the thermistor bolometer 4. Thermistor bolometer 4, changes in temperature as the infra-red radiation impinging thereon changes, causing a corresponding change in its resistance. This resistance change results in the generation of a varying direct voltage signal whose amplitude is proportional to the difference in temperature of the unknown and the reference source. A pulse generator generally indicated at 10 generates pulses in synchronism with the chopping disc for purposes hereinafter described.

Referring to Figure 3, the varying direct voltage signal developed by thermistor bolometer 4 is fed to preamplifier 12, which is physically located close to the thermistor bolometer to minimize pickup. The remainder of the equipment may be some distance from the preamplifier; connection 14 between preamplifier 12 and amplifier-attenuator 16 may thus be a relatively long cable. Amplifier-attenuator 16 can either amplify or reduce the signal size so that the signal appearing at its output has a relatively constant average amplitude. This is fed to one movable contact 22 of a synchronous contactor, generally indicated at 20. Contactor 20 is operated by the output of the pulse generator 10. The fixed contacts 24 and 26 associated with movable contact 22 are connected to the push-pull input of a direct current amplifier 28 whose output is fed to a conventional recorder 32. The movement of the recorder pen or stylus is proportional to the amplitude of the direct current amplifier output voltage. The paper chart on which this pen or stylus writes is usually driven by a constant speed motor and thus a record of the variations of output of the thermistor bolometer with time may be obtained. A meter 34 may also be connected to the output of the direct current amplifier 28 for monitoring purposes.

The offsetting of the signal developed by the thermally sensitive resistance unit is accomplished as follows. A potentiometer generally indicated at 36 comprising a resistance 37 and a movable arm 40 is connected across a source of direct voltage shown herein as a battery 38. Movable arm 40 is connected to a reversing switch generally indicated at 42, which in turn is connected to one fixed contact 48 of a second set of contacts on synchronous contactor 20. The other fixed contact 50 of this second set is also connected to the reversing switch 42 and through it, may be connected to the common side of the battery 38 and the potentiometer 36. The voltage appearing on movable contact 52 will be an alternating voltage either in phase, or 180° out of phase with the voltage developed by the thermistor bolometer 4 depending upon the position of reversing switch 42. This voltage is fed through an attenuator 54 to the cathode 56a of input tube 56 in preamplifier 12. By proper selection of the phase of the voltage appearing on the fixed contacts 48 and 50 of contactor 20, the voltage appearing at the cathode 56a will subtract from the thermistor bolometer signal applied to the grid 56b of the same tube and the signal appearing at the plate 56c of the input tube 56 will be the difference between these two voltages. The amplitude of the voltage appearing on movable contact 52 can be adjusted by the potentiometer 36, and thus a variable offset of the voltage developed by the thermistor bolometer 4 is obtained.

More specifically, in Figure 1 the optical system generally indicated at 2 which focuses the infra-red radiation on the thermistor bolometer 4, comprises two mirrors 60 and 62 with shaped optical surfaces 60a and 62a respectively. Mirrors are preferably used to focus the incident radiation, since lenses have chromatic aberration and do not faithfully transmit infra-red radiation. In the particular system shown, which is known as a "Cassegrain telescope," incident radiation is reflected from the surface 60a to the surface 62a, thence through the hole 60b in mirror 60 to the thermistor bolometer 4 as shown by the arrows. Two mirrors rather than one are used since they take less space and permit the grouping of auxiliary equipment around the thermistor bolometer 4 which would not be feasible if placed in front of a single mirror.

The chopping disc 6, to periodically interrupt the incident radiation, may be a glass disc from which two opposite 90° segments have been removed. As previously explained its rear surface 6a is silvered to reflect radiation from the reference or known source 8 to the thermistor bolometer 4 when it interrupts radiation from the unknown source. Disc 6 is mounted on shaft 63 which in this embodiment of the invention may be rotated at a speed of approximately 77 revolutions per second by an electric motor or other like driving means (not shown). A speed such as this is chosen since it is sufficiently low for the thermistor bolometer sensitive element to follow, but above the standard 60 cycle power frequency and therefore bears no integral relation therewith. Thus the effect of 60 cycle pickup in the subsequent amplifying system is minimized. However this speed is not critical and others might be used.

The standard reference source 8 is a block 64 of material such as copper, aluminum or other material of good heat conductivity having a cone-shaped cavity 64a in one face. This cavity is coated with an infra-red absorbing material such as black paint. A blackened cone-shaped cavity of this type behaves as an ideal "black body," and if its temperature is known the radiation emitted therefrom will also be known. To illustrate the behavior of the cone as a "black body" consider that infra-red energy is incident on the cone 64a. A particular ray striking the side of the cone is absorbed about 95%, and the remainder is reflected; the reflected portion travels deeper into the cone and is again partially absorbed and partially reflected, again the larger percentage being absorbed. The nonabsorbed portion again is reflected deeper into the cone where the same process continues. Thus radiation incident on the cone is almost completely absorbed as it would be if the cone were an ideal black body. The cone behaves in a similar fashion as a radiation source. A bead thermistor 66, inserted in the block 64 is connected to a bridge circuit (not shown) for accurate measurement of the temperature of the reference source if the temperature is not thermostatically controlled. When measuring the temperature of an unknown object, it is necessary to measure simultaneously the temperature of the reference source, since the signal developed by the thermistor bolometer 4 is proportional to the difference in radiation between these two sources. When the average temperature of the unknown object and the ambient temperatures are close to each other, the average signal developed by the thermistor bolometer 4 is very small. However variations with time in the temperature of the unknown source show up as large percentage variations in the average signal.

As previously mentioned, to avoid the necessity of reading the temperature of the standard reference source 8 each time it is desired to measure the temperature of an unknown object, the reference temperature may be thermostatically controlled. This is most easily accomplished by heating the reference cavity with a coil of resistance wire (not shown) and controlling the current flow therethrough by a thermostatically controlled switch. To effectively control the temperature, it is usually necessary to set the thermostatic control to maintain the standard reference cavity 8 at a temperature above the highest ambient temperature that may be expected. Thus signals from an unknown source whose average temperature is considerably below such highest expected ambient temperature have a relatively large average value and variations in the signal are a relatively small percentage of the average signal developed by the thermistor bolometer. The electronic signal offsetting means of our invention is especially useful in this situation being particularly designed to offset the average value of the signal to a small value, thus again making variations in the thermistor signal a relatively large percentage of the average signal for recording purposes.

The thermistor bolometer generally indicated at 4 as seen in Figure 2 may include illustratively a base 68, usually a material of high heat conductivity such as copper or aluminum. Base 68 is set in a counter-bored metal cylinder 70 which serves as a housing sidewall. An infra-red transparent window 72 is inset in a counterbore 70a in cylinder 70 opposite base 68. A flake 74 of thermally sensitive resistance material mounted on a backing block 76 of electric insulating thermally conducting material is supported on base 68. Leads are attached to the thermally sensitive flake and to pins 78 extending through the base 68 but electrically insulated therefrom by insulators 79. Thermistor bolometer 4 is mounted in such a position that when the radiation from the reflecting system is not interrupted by the chopping disc 6 it will fall on the flake 74 of thermally sensitive material. It is desirable to keep the leads 80 connecting pins 78 to the preamplifier 12 as short as possible to minimize pickup of extraneous signals, and therefore the thermistor bolometer is usually mounted directly on the housing of the preamplifier.

One method for generating pulses in synchronism with the signal developed by the thermistor bolometer is generally illustrated at 10 in Figure 1. A butterfly shaped disc 82 of magnetic material, such as sheet iron or steel is attached to shaft 63 which drives the chopping disk 6. This disc is made in the same way as the chopping disc, i.e. 90° segments are cut from opposite sides of a circular disc of the desired material. A generally U-shaped magnet 84 whose arms form north and south poles is located so that the disc rotates therebetween. To improve the action of the pulse generator, pole-pieces 86 and 88 may be attached to the arms of the U to concentrate the flux in the air gap 85 between them. A coil 90 is wrapped around the base of the U-shaped magnet 84. As the disc rotates, the air gap 85 will alternately be occupied with the magnetic material of disc 82 and with air. The flux flowing in the magnetic circuit due to the permanent magnet 84 changes depending upon the total reluctance in the circuit, and the reluctance of air gap 85 is a large part of such total reluctance. Each time the reluctance, and therefore the flux changes there is a change in the magnetic flux linking the turns of coil 90, and such change will induce a current in coil 90 proportional to the number of turns of the coil and the rate of change in flux. Thus as one segment of the disc 82 moves into the gap 85 there is a decrease in reluctance and an increase in flux linking the coil 90 and a positive pulse of current is generated thereby. Similarly as a segment of the disc 82 moves out of the gap 85 there is a decrease in the steady state flux, a pulse of current of opposite direction is generated in the coil 90. By properly positioning the disc 82 on shaft 63 with respect to chopping disc 6, these pulses can be made to occur in exact time synchronism with the alternations of the voltage developed by thermistor bolometer 4.

As shown in Figure 3, the thermally sensitive flake 74 is connected in series with a second similar flake 92 across a voltage source 94, illustratively shown as a battery. The thermally sensitive resistor 92 is identical with thermistor 74 except that it is shielded from all radiation, although subject to the same ambient temperatures, thus insuring that the signal appearing at the junction of these two elements is not affected by changes in ambient temperature of the sensitive element, but none the less fully responsive to temperature changes caused by changes in radiation. The varying direct output from the junction of the two thermally sensitive resistors 74 and 92 is fed via lead 96 to capacitor 97 and resistor 98 which in turn are connected to grid 56b of input tube 56. After amplification and offsetting, the signal is fed from plate 56c of input tube 56 via condenser 99 through the subsequent stages of a conventional alternating current amplifier, illustrated by amplifier 100. Thus preamplifier 12 provides means for adding together the input signal (lead 96) and the offsetting signal (lead 117) as has been explained to amplify that difference and to match the impedance of the preamplifier 12 to cable 14. Matching is usually accomplished by a conventional cathode follower stage but except for the circuits in Figure 3, the preamplifier is of conventional design; therefore circuit details are not shown or described being well-known to those skilled in the art. Line 14 carries the output of preamplifier 12 to the amplifier-attenuator 16 which may be conveniently a conventional alternating current amplifier and attenuator to either amplify or attenuate the input signal and maintain a proper signal level at the contacts of synchronous contactor 20 to be described hereafter.

Synchronous contactor 20 is a high speed electro-mechanically operated switch mechanism having two sets of contacts or switches i.e. movable contact 22 with fixed contact 24 and 26 and movable contact 52 with fixed contacts 48 and 50. These movable contacts may include reeds of magnetic material attached to the ends of a fixed core also of magnetic material with a coil 21 wrapped around it. The reeds and contacts are mounted in a magnetic field generated either by a permanent or an electromagnet. If coil 21 were to be energized by an alternating voltage, the polarity of the core would reverse at the rate of alternation of the applied voltage. The reeds attached to the core would then assume the same polarity as the end of the core to which they are attached, and thus would be attracted to opposite pole pieces of the permanent or electromagnet, reversing position with each reversal of polarity. The movable contacts on the reeds would thus oscillate from one fixed contact and to the other. These reeds are very light and the distance between the fixed contacts is very small enabling the movable contacts to follow relatively high frequencies. The use of alternating voltage is entirely feasible. However we have found it possible to supply the coils of these contactors with pulses of electrical energy rather than an alternating voltage in which event the reeds follow such pulses. Thus in the embodiment described the alternating pulses from the pulse generator 10, previously described, may be fed directly via lead 101 to the coil 21 of the synchronous contactor 20 if the generated pulses have sufficient power. However I have found that it is preferable to feed the pulses to a "one shot" multivibrator 102 of conventional design followed by a differentiating circuit 103, also of conventional design. The output pulses from the differentiator 103 have greater power than those generated by the pulse generator 10 and they are also sharper, thus giving more precise switching. Since the pulses alternate in polarity they cause the reeds to move so the movable contacts will engage first one and then the other set of fixed contacts in the same manner as an alternating voltage. Thus synchronous contactor 20 operates as a high speed toggle switch in response to pulses from the pulse generator 10, switching from one set of fixed contacts to the other in synchronism with the developed signal.

The alternating output of amplifier-attenuator 16 is fed via lead 104 to the movable contact 22 of synchronous contactor 20. Since contact 22 operates in exact synchronism with the alternating signal it will engage one of the fixed contacts for example contact 24 at all times when the signal appearing on it is of one polarity, and will engage the other contact, for example contact 26, at all times when the alternating signal is of the opposite polarity. Any slight lag in the operation of the synchronous contactor can be compensated by adjusting the pulse generator disc 82 (Figure 1) with respect to the chopping disc 6 on the shaft 63 to cause the pulses to slightly "lead" the signal.

The varying direct voltages appearing on contacts 24 and 26, which are equal in magnitude but of opposite polarity, are filtered by condensers 105 and 106 and applied as a push-pull input to a direct current amplifier 28. Incorporated in the direct current amplifier 28 is a conventional variable filter which acts as a bandwidth control. This permits selection of optimum bandwidth for measurements in specific circumstances. For example if a minimum bandwidth is selected, the system yields maximum sensitivity but has an increased response time. Conversely by selection of a maximum bandwidth the system yields minimum response time but with decreased sensitivity. The output of the direct current amplifier, which is also usually taken from a cathode follower stage to provide a low impedance, is fed directly to a suitable recorder 32. As previously explained the recorder in general employs a pen or stylus whose movement is proportional to the amplitude of the input signal from the direct current amplifier 28. This pen or stylus writes on a moving paper or chart which is driven by a constant speed motor (not shown) and thus a record of the output of the device as a function of time is obtained. For the convenience of the operator, a meter 34 which measures instantaneous output, is sometimes incorporated and is, in general, connected to the output of the direct current amplifier 28 as shown in Figure 2.

Offsetting of the signal developed by the thermistor bolometer 4 is accomplished by feeding a controlled direct voltage to one of the sets of fixed contacts of the synchronous contactor 20 and adding the voltage developed on the movable contact to the input signal in proper phase to subtract therefrom. To accomplish this a source of direct voltage, illustrated by the battery 38, is used to energize the winding 37 of a potentiometer 36, preferably of the precision wire wound type. The voltage appearing on movable arm 40 of the potentiometer is fed to one movable contact 107 of a double-pole double-throw switch generally indicated at 42. The other movable contact 108 of the switch is connected to the common junction of one end of resistance winding 37 and the battery, in this case ground. The fixed contacts 110, 112, 114 and 116 of switch 42, are wired to fixed contacts 48 and 50 of synchronous contactor 20. Contact 110 associated with movable contact 107 and contact 116 associated with movable contact 108 are connected to contact 48, and contacts 112 and 114 are similarly wired to contact 52. When movable contacts 107 and 108 are engaging fixed contacts 110 and 112 respectively, the voltage appearing on the movable arm 40 of potentiometer 36 appears on fixed contact 48 while fixed contact 50 is connected to ground. If the switch is thrown to its other position, fixed contact 48 is grounded and fixed contact 50 is connected to the potentiometer 40. Thus the polarity of the voltage appearing on the contacts 48 and 50 may be reversed.

Movable contact 52 of synchronous contactor 20 operates in synchronism with the generated signal and engages alternately contacts 48 and 50. The voltage developed on movable contact 52 is thus a square wave of direct voltage with alternate periods of zero potential, whose phase may be reversed by changing the position of switch 42. The voltage appearing on contact 52 is fed via lead 117 to attenuator 54 composed of resistors 118 and 120 and from thereto the cathode 56a of input tube 56 in preamplifier 12. Resistor 118 is preferably approximately 1,000 times the value of resistor 120; thus the voltage appearing at the output of attenuator 54 will be approximately 1/1000 that appearing on contact 52, and of approximately the same amplitude as the signal voltage. Resistor 120 also serves as a cathode resistor for tube 56. Any varying direct voltage appearing at the cathode 56a is amplified by tube 56 and appears as a varying voltage at the plate 56c. Thus the varying plate voltage will be in phase with the voltage appearing on movable contact 52. However, the signal voltage appearing at plate 56c due to the signal on grid 56b will be 180° out of phase with the grid voltage. Thus, if the phase of the voltage appearing at the cathode 56a is the same as that appearing at the grid 56b of the tube, the signal appearing at the plate will be the difference between these two voltages. Accordingly preamplifier 12 amplifies the difference of two signals appearing at its two input terminals. If instead of subtracting, preamplifier 12 added signals appearing on its inputs the phase of the offsetting voltage would have to be reversed by switch 42 to accomplish the necessary subtraction. Accordingly if the average value of the voltage appearing at the cathode 56a is set to be substantially the same as the average signal appearing on the grid 56b, the average difference, which is the signal to be amplified, would cause a very small deflection of the recorder pen. Thus the recorder may be set on a very sensitive scale and variations in the plate signal caused by small departures from its average value of the thermistor bolometer signal will cause large pen deviations and will be readily seen on the recorder. The amplitude of the offsetting signal at the cathode 56a can be controlled by adjustment of the movable arm 40 of the potentiometer 36. To properly adjust potentiometer 36, a meter 122 may be provided to measure the voltage appearing on the movable contact 52. This meter may be calibrated in volts and also in temperature, if the voltage temperature correlation of the particular thermistor bolometer in use is known. Since the offsetting of the thermistor bolometer signal takes place at the input to the preamplifier, subsequent amplifying circuits in preamplifier 12, amplifier attenuator 16, and direct current amplifier 28 are not required to have a dynamic range capable of handling the entire signal developed by the thermistor bolometer; their range need only be sufficient to handle the largest expected variations in this signal. Similarly, the recorder can be set to a scale of such sensitivity that maximum pen deflection will correspond to maximum deviation from the average signal value. In this way the recorder displays only variation in the thermistor bolometer signal and does not record the average value of the signal, which can be readily computed from the temperature of the reference standard and the amount of offset voltage as read from the meter 122.

Figure 4 illustrates another embodiment of my offset circuit, which obviates the need for the reversing switch 42, and in addition provides for calibration of the recorder. As shown in this figure the output of battery 38 is fed across the potentiometer 36, and movable arm 40 of the potentiometer is connected directly to fixed contact 48 of the synchronous contactor 20. A second source of direct voltage illustrated by battery 124 is connected across a tapped voltage divider 126. Fixed contacts 134, 136, 138, 140 and 142 of a multi-pole single throw switch generally indicated at 130 are connected to taps of voltage divider 126 and the output from the movable arm 132 of this switch is connected to fixed contact 50 of the synchronous contactor. These taps are preferably at equally spaced intervals along voltage divider 126. In such instance contact 134 is connected to the mid-point of the voltage divider, contacts 136 and 138 carry ¾ and ¼, respectively, of the voltage of battery 126 while contact 140 has the entire battery voltage on it and contact 142 is grounded. The voltages of batteries 124 and 38 are preferably the same and in fact may be the same source if desired. The phase of the alternating component of voltage on contact 52, is thus determined by the relative positions of arm 40 of potentiometer 36 and contact 132 of switch 130. Thus if arm 40 is set in mid-position on winding 37 and contact 132 engages contact 134, connected to the mid-position of the voltage divider 126, and batteries 38 and 124 are of the same voltage, the voltage appearing on contacts 48 and 50 will be exactly the same. The voltage developed on contact 52 as it switches between contacts 48 and 50 will be a constant potential with no variation therein. Since preamplifier 12 responds only to alternating components, such a constant voltage applied at the cathode 56a of tube 56 will affect only the direct voltage level of the plate 56c and will produce no change in the atlernating output signal from the preamplifier. However if movable contact 132 is switched to contact 138, which taps voltage divider 126 at a lower potential than contact 134, and arm 40 is not moved from its previous mid-position on winding 38, contact 48 will be at a higher potential than contact 50, assuming battery polarity as shown. Thus as movable contact 52 switches between contacts 48 and 50 there will be varying direct voltage thereon, whose alternating component is in synchronism with the incoming signal, and whose amplitude is determined by the relative positions of arm 40 and movable contact 132 of switch 130. The phase of this signal may be reversed by switching movable contact 132 from fixed contact 138 to fixed contact 136 or 140 which would then cause contact 50 to be at a higher potential than fixed contact 48. If complete flexibility is desired, the tapped voltage divider 126 and switch 130 may be replaced by a potentiometer similar to potentiometer 36.

The embodiment of Figure 4 also provides a simple calibrating method for the entire system. Assuming that the system is in operation and the voltage developed on movable contact 52 is of the proper phase and amplitude to offset the average signal developed by the thermistor bolometer 4, if movable contact 132 is temporarily moved in either direction it will cause an alternating voltage of increased amplitude to appear on the cathode 56c of tube 56 which will correspond to an increase in temperature of the thermistor bolometer since it is fed into the amplifier at the same point. This temporary increase in the amplitude of the voltage fed to the recorder will be immediately apparent and the amount of pen deflection caused by this voltage change may be read directly on the recorder in terms of the corresponding temperature variation.

While I have described the synchronous contactor 20 as being operated by a pulse train of alternating pulses in synchronism with the alternating signal developed by the thermistor bolometer 4, the synchronous contactor might be driven by an alternating sine or square wave or the like similarly related to the signal. Further, although I have utilized an electromagnetically operated synchronous contactor, vacuum or gas tubes or semi-conductor devices could be used for the same purpose but the apparatus shown is practical, efficient and comparatively economical. Thus the term "switch" as used herein and in the claims is intended to be generic to equivalent circuits using vacuum tubes, gas tubes, or semi-conductor devices.

Thus I have described apparatus for accurately recording small variation in an alternating or varying direct signal of nonstandard frequency and phase by providing a calibrated signal to offset the average value of the generated signal, so that variations therein are readily apparent. This has been accomplished without the use of additional tubes for switching by utilizing a second set of contacts available on the synchronous contactor. This offsetting may be accomplished irrespective of the phase of the generated signal since the synchronous contactor can be adjusted to switch exactly in synchronism with the signal. Also, as I have shown, this offsetting means may be combined with apparatus to provide for simple calibration of the amplifying and recording system. Further I have shown that this apparatus is particularly useful in instruments which measure variations in the temperature of objects by measuring the infra-red radiation emitted therefrom, although it is not so limited.

It will thus be seen that the objects set forth above, among those made apparent in the preceding description, are efficiently attained and, since certain changes may be made in the above constructions without departing from the scope of the invention, it is intended that all matter contained in the above description or shown in the accompanying drawing shall be interpreted as illustrative and not in a limiting sense. It is also to be understood that the following claims are intended to cover all the generic and specific features of the invention herein described, and all statements of the scope of the invention which, as a matter of language, might be said to fall therebetween.

Having described my invention, I claim:

1. In a radiometer for measuring the temperature of objects by the emitted infrared radiation therefrom, a source of infrared energy of controlled temperature substantially different from the average temperature of the infrared radiation from the objects, an infrared detector producing an electrical signal in accordance with the infrared radiation impinging thereon, periodic means for alternately directing onto the detector infrared radiation from the object and from the source, a generator producing a signal substantially in synchronism with the periodically varying signal developed by the detector, electronic means for processing the signal from the detector including amplifying means and synchronous detecting means the latter actuated by the signal from the generator, indicating means and means for connecting the output signal of the synchronous detecting means thereto, at least one adjustable source of voltage adjusted to the difference of the electrical signal produced by the controlled infrared source and the average of the electrical signal produced from the objects, means for connecting the source of voltage to the electronic processing means in a phase to substantially offset the difference in electrical signal produced by the controlled infrared source and the average of the electrical signal produced from the objects.

2. A radiometer according to claim 1 in which the means for connecting the source of voltage to the electronic processing means is a synchronously actuated solenoid switch.

3. A radiometer according to claim 1 in which the offsetting electrical signal is connected to the input of the amplifying means.

4. In a radiometer for measuring the temperature of objects by the emitted infra-red radiation therefrom, a source of infra-red energy of controlled temperature, a thermistor bolometer to generate an electrical signal proportional to the infrared radiation impinging thereon, a rotating radiation chopping mirror which exposes said thermistor bolometer alternately to said source of known radiation and to the radiation from the object whose temperature is to be measured, a pulse generator adapted to provide a pulse train substantially in synchronous phase and frequency with the periodically varying signal developed by said thermistor bolometer, an alternating current amplifier having at least two inputs and at least one output, the voltage appearing at said output being proportional to the differences of the signal appearing at said inputs, means connecting the varying signal generated by said thermistor bolometer to one of said amplifier inputs, a multivibrator connected to said pulse generator, the signal from said multivibrator operating a synchronous contactor having at least two sets of contacts in synchronism with said periodically varying thermistor signal, means connecting the output of said alternating current amplifier to a movable contact of a first set of said contacts, a direct current amplifier whose input is derived from the fixed contacts of said first set of contacts, signal recording means connected to the output of said direct current amplifier, at least one adjustable source of direct voltage connected to the fixed contacts of a second set of contacts of said synchronous contactor, means connecting the movable contact of said second set of contacts to another input of said alternating current amplifier, a phase controller to control the phase of the voltage supplied to said second amplifier input whereby said voltage is supplied in proper phase to offset a portion of the signal developed by said thermistor bolometer.

5. The combination defined in claim 4 in which the phase controller is a reversing switch interposed between the voltage source and the fixed contacts of said second set of contacts of said synchronous contactor.

6. The combination defined by claim 4 in which one adjustable source of direct voltage is connected to one fixed contact of said second set of contacts of said synchronous contactor, and a second adjustable source of direct voltage is connected to the other fixed contact of said synchronous contactor, said second source of direct voltage being reversible in polarity, thereby to control the phase of the voltage appearing on said movable contact.

7. The combination defined in claim 4 in which means for differentiating the output of said multivibrator with respect to time is interposed between said multivibrator and said synchronous contactor.

References Cited in the file of this patent

UNITED STATES PATENTS

| | | |
|---|---|---|
| 1,441,426 | Kaisling | Jan. 9, 1923 |
| 2,154,065 | Davis et al. | Apr. 11, 1939 |
| 2,621,298 | Wild et al. | Dec. 9, 1952 |
| 2,674,155 | Gibson | Apr. 6, 1954 |
| 2,679,010 | Luft | May 18, 1954 |
| 2,679,184 | Atwood | May 25, 1954 |
| 2,680,989 | Savitsky et al. | June 15, 1954 |
| 2,698,390 | Liston | Dec. 28, 1954 |
| 2,710,559 | Heitmuller et al. | June 14, 1955 |
| 2,729,103 | Raynsford et al. | Jan. 3, 1956 |
| 2,750,834 | Golay | June 19, 1956 |
| 2,755,389 | Jones et al. | July 17, 1956 |
| 2,886,970 | Munker | May 19, 1959 |

FOREIGN PATENTS

| | | |
|---|---|---|
| 726,581 | Great Britain | Mar. 23, 1955 |